Patented Dec. 16, 1952

2,622,096

UNITED STATES PATENT OFFICE 2,622,096

ADDUCT OF DIALKYL ESTERS OF AN ALKENE PHOSPHONIC ACID WITH HEXACHLORO CYCLOPENTADIENE

Elbert C. Ladd, Passaic, N. J., assignor to United States Rubber Company, New York, N. Y., a corporation of New Jersey No Drawing. Application July 12, 1951, Serial No. 236,462

3 Claims. (Cl. 260—461)

This invention relates to improvements in chemicals.

More particularly, the invention is concerned with novel adducts of dialkyl esters of an alkenephosphonic acid and hexachlorocyclopentadiene. The alkene group of the phosphonic ester may be any alkene group, for example, ethene, propene, pentene, hexene, heptene, octene, etc., and the olefinic bond may be located anywhere in the chain. The alkyl groups of the phosphonic esters may be any alkyl groups, for example, methyl, ethyl, propyl, butyl, isopropyl, isobutyl, amyl, hexyl, 2-ethylhexyl, dodecyl.

The formula of the phospho ester is represented by

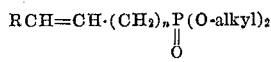

$n$ is a variable figure including zero, preferably 0 to 8, and R is unbranched alkyl.

Reaction is accomplished by mixing the said diene with the alkenephosphonic ester, suitably in a 1:1 or higher molar ratio of ester to diene, and heating to a suitable temperature, for example, 50–250° C., preferably from 100–200° C., until reaction is complete. The reaction may be conducted in a vessel open to the atmosphere, or in a closed system. An autoclave or other pressure reactor is used where either of the reactants has a sufficiently high vapor pressure to make such apparatus desirable or necessary. The reaction usually does not require over 24 hours for completion, and may be complete in 2–16 hours, or even less. The products are separated by concentration in vacuo, steam distillation, fractional distillation, or preferential extraction.

The products are useful in formulation of lube-oil additives for increasing the film strength of lubricating oils, and as plasticizers for plastics, including polyvinyl chloride.

The following examples illustrate the invention.

Example 1

A mixture of 16.4 gms. (0.1 mole) of diethyl ethenephosphonate and 27.3 gms. (0.1 mole) of hexachlorocyclopentadiene was heated at 140–150° C. for 8 hours, after which the reaction mixture was steam distilled. The undistilled residue was isolated, and dried by briefly heating at 100°/1.0 mm. The brown, solid residue, weighing 35.3 gms. (80.8% yield) is considered to be diethyl 1,4,5,6,7,7-hexachlorobicyclo [2.2.1]-5-heptene-2-phosphonate.

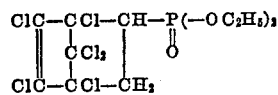

Analysis:
Found _____ Cl, 48.97; P, 6.45
Theoretical for $C_{11}H_{13}Cl_6O_3P$ __ Cl, 48.69; P, 7.09

Example 2

Twenty-nine grams of diethyl 2-propenephosphonate

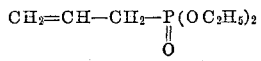

and 45 grams of hexachlorocyclopentadiene are heated in a glass flask at 100° C. for 18 hours. During this time the mixture becomes a dark amber color and undergoes a considerable increase in viscosity. The mixture is then subjected to steam distillation. That the reaction is essentially complete is shown by the fact that very little, if any, steam-volatile material is present, and the product, which is diethyl 1,4,5,6,7,7-hexachlorobicyclo [2.2.1]-5-heptene-2-methanephosphonate, is sufficiently pure for most purposes, it being known that hexachlorocyclopentadiene is readily steam distillable. The oil layer remaining in the still is dried over sodium sulfate.

It is a viscous, amber-colored oil, $n_D^{20.5}=1.519$.
Analysis:
Found _____ P, 6.28%; Cl, 46.01%
Theory for

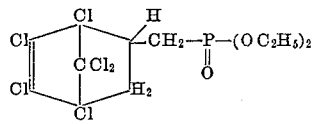

P, 6.88%; Cl, 47.2%

Having thus described my invention, what I claim and desire to protect by Letters Patent is:

1. A method which comprises reacting and combining equimolecular proportions of dialkyl alkenephosphonate and hexachlorocyclopentadiene by heating the reactants at a temperature in the range from about 50° C. to about 250° C.

2. A compound of the formula

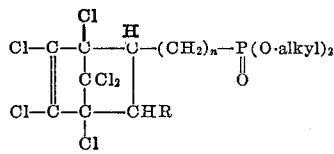

where $n$ is a variable figure including zero, and R is unbranched alkyl.

3. Diethyl 1,4,5,6,7,7-hexachlorobicyclo [2.2.1]-5-heptene-2-phosphonate.

ELBERT C. LADD.

REFERENCES CITED

The following references are of record in the file of this patent:

UNITED STATES PATENTS

| Number | Name | Date |
| --- | --- | --- |
| 2,535,175 | Tawney | Dec. 26, 1950 |
| 2,550,651 | Dickey | Apr. 24, 1951 |
| 2,553,417 | Ladd | May 15, 1951 |